United States Patent
Moore et al.

(10) Patent No.: US 9,715,748 B2
(45) Date of Patent: Jul. 25, 2017

(54) METHOD AND APPARATUS FOR GRAPHICAL DATA INTERACTION AND VIZUALIZATION OF GRAPHS VIA PATHS

(71) Applicant: THE UNITED STATES OF AMERICA AS REPRESETNED BY THE SECRETARY OF THE AIR FORCE, Washington, DC (US)

(72) Inventors: Jason A. Moore, Taberg, NY (US); Timothy Lebo, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 264 days.

(21) Appl. No.: 14/810,800

(22) Filed: Jul. 28, 2015

(65) Prior Publication Data

US 2016/0163076 A1     Jun. 9, 2016

Related U.S. Application Data

(60) Provisional application No. 62/087,289, filed on Dec. 4, 2014.

(51) Int. Cl.
G06T 11/20     (2006.01)
G06F 17/30     (2006.01)

(52) U.S. Cl.
CPC ............ *G06T 11/206* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 6,976,212 B2* | 12/2005 | Newman | ............ | G06F 17/2247 345/619 |
| 2008/0282189 A1* | 11/2008 | Hofmann | ............ | G06F 17/212 715/793 |
| 2008/0295038 A1* | 11/2008 | Helfman | ............ | G06T 11/206 715/853 |
| 2010/0174975 A1* | 7/2010 | Mansfield | ............ | G06F 17/211 715/227 |

* cited by examiner

*Primary Examiner* — Ryan R Yang
(74) *Attorney, Agent, or Firm* — Joseph A. Mancini (57) ABSTRACT

Method for displaying and identifying relevant paths through a graph by displaying them in a tabular format and providing user defined and computed values and filters. Each graph is represented as a set of nodes and edges. Each path through the graph is displayed as a row in a table where the user can apply sorting, filtering, and compute intrinsic or extrinsic information to augment the data.

9 Claims, 7 Drawing Sheets

Sort State 1

Figure 1: Initialization State

Figure 2: Sort State 1

Figure 3: Sort State 2

| Node 1 | | | Edge 1 | | Node 2 | | | Edge 2 | | Node 3 | | |
|---|---|---|---|---|---|---|---|---|---|---|---|---|
| Label | Value ▼ | Valid | Label | Weight | Label | Value | Valid | Label | Weight | Label | Value | Valid |
| D | 9 |   | AD | 2 | A | 3 | T | AC | 10 | C | 2 | F |
| D | 9 |   | AD | 2 | A | 3 | T |   |   |   |   |   |
| D | 9 | T | AD | 2 |   |   |   |   |   |   |   |   |
| A | 3 | T | AD | 2 | D | 9 |   |   |   |   |   |   |
| A | 3 | T | AC | 10 | C | 2 | F |   |   |   |   |   |
| A | 3 | F | AC | 10 | A | 3 | T | AD | 2 | D | 9 |   |
| C | 2 | F | AC | 10 | A | 3 | T |   |   |   |   |   |
| C | 2 | F |   |   |   |   |   |   |   |   |   |   |
| C | 2 | F |   |   |   |   |   |   |   |   |   |   |
| B |   |   |   |   |   |   |   |   |   |   |   |   |

300 → (arrow pointing to Edge 1 Weight column)

| Filter \| Value < 5 | | | | | | | | | | |
|---|---|---|---|---|---|---|---|---|---|---|
| Node 1 | | | Edge 1 | | Node 2 | | | Edge 2 | | Node 3 | | |
| Label | Value | Valid | Label | Weight | Label | Value | Valid | Label | Weight | Label | Value | Valid |
| A | 3 | T | | | | | | | | | | |
| C | 2 | F | | | | | | | | | | |
| A | 3 | T | AC | 10 | C | 2 | F | | | | | |
| C | 2 | F | AC | 10 | A | 3 | T | | | | | |
| B | 9 | F | | | | | | | | | | |
| D | 9 | | | | | | | | | | | |
| A | 3 | T | AD | 2 | D | 9 | | | | | | |
| D | 9 | | AD | 2 | A | 3 | T | | | | | |
| C | 2 | F | AC | 10 | A | 3 | T | | | | | |
| D | 9 | | AD | 2 | A | 3 | T | AC | 10 | C | 2 | F |

Figure 4: Filter from Initial State

Figure 5: Column Filter from Initialization State

| Node 1 | | | Edge 1 | | | Node 2 | | | Edge 2 | | | Node 3 | | |
|---|---|---|---|---|---|---|---|---|---|---|---|---|---|---|
| Label | Value | Valid | Label | Weight | Valid | Label | Value | Valid | Label | Weight | Valid | Label | Value | Valid |
| A | 3 | T | | | | | | | | | | | | |
| A | 3 | T | AC | 10 | | C | 2 | F | | | | | | |
| A | 3 | T | AD | 2 | | D | 9 | | | | | | | |
| B | | F | | | | | | | | | | | | |
| C | 2 | F | AC | 10 | | A | 3 | T | | | | | | |
| C | 2 | F | | | | | | | | | | | | |
| D | 9 | | AD | 2 | | A | 3 | T | | | | | | |
| D | 9 | | AD | 2 | | A | 3 | T | AD | 2 | | D | 9 | |
| | | | | | | | | | AC | 10 | | C | 2 | F |

Figure 6: Sort by Label then Bundle Edges

| Custom 1 | Node 1 | | | Edge 1 | | Node 2 | | | Edge 2 | | Node 3 | | |
|---|---|---|---|---|---|---|---|---|---|---|---|---|---|
| Path Length | Label | Value | Valid | Label | Weight | Label | Value | Valid | Label | Weight | Label | Value | Valid |
| 1 | A | 3 | T | | | | | | | | | | |
| 1 | B | | F | | | | | | | | | | |
| 1 | C | 2 | F | | | | | | | | | | |
| 1 | D | 9 | | | | | | | | | | | |
| 2 | A | 3 | T | AC | 10 | C | 2 | F | | | | | |
| 2 | C | 2 | F | AC | 10 | A | 3 | T | | | | | |
| 2 | A | 3 | T | AD | 2 | D | 9 | T | | | | | |
| 2 | D | 9 | | AD | 2 | A | 3 | T | | | | | |
| 3 | C | 2 | F | AC | 10 | A | 3 | T | AD | 2 | D | 9 | |
| 3 | D | 9 | | AD | 2 | A | 3 | T | AC | 10 | C | 2 | F |

Figure 7: Insert Main Level Column

METHOD AND APPARATUS FOR GRAPHICAL DATA INTERACTION AND VIZUALIZATION OF GRAPHS VIA PATHS

STATEMENT OF GOVERNMENT INTEREST

The invention described herein may be manufactured and used by or for the Government for governmental purposes without the payment of any royalty thereon.

BACKGROUND OF THE INVENTION

Mathematical graphs which are made up of nodes and edges are pervasive in day to day life. Graphs are even more essential for analysts that rely on graph based data for analyzing domains such as social networks, computer networks, road networks, subway maps and command and control structures. This makes graph visualization and understanding pivotal to effectively using these potentially large and complex graph based data sources.

Traditional graph visualization uses one or more graph layout algorithms to draw rectangles and lines to depict nodes and edges in the graph. These visualizations often rely on algorithms that attempt to layout the graph using poorly balanced aesthetic principles. While the readability of the graphs is the principle purpose of these layout algorithms, increasing graph size and complexity are reducing the effectiveness of these algorithms to allow the user to quickly and easily digest both the structure and the content of these graphs. This problem is further exacerbated for graphs where the number of nodes greatly exceeds the display area.

Traditional graph visualizations also often fail to maintain the gestalt principle of proximity where the viewer automatically correlates graph elements' proximity to some form of relationship between those elements. Another failing of traditional graph visualizations is that they are ill-suited to address rapid sequential questions where each layout that optimizes a particular question can often cause the entire display to change radically. A layout optimizing a single path through a graph may omit values at the nodes; another layout that bundles edges to give the overall flow within a graph makes it impossible to see which paths actually exist. Overall, each traditional layout compromises which aspects of a graph is displayed.

OBJECTS AND SUMMARY OF THE INVENTION

One object of the present invention is to provide a method and apparatus for displaying computer generated graphs as a series of paths in a tabular form.

Another object of the present invention is to provide a method and apparatus for prioritizing the order of the computer generated data paths that are displayed in order to satisfy dynamic user queries for information.

Yet another object of the present invention is to provide a method and apparatus to allow the user to interact with a computer system to generate new information based on data both internal and external to the graph while still being able to use these new results for prioritizing the sorting order of the paths.

The invention disclosed herein provides a method and apparatus for displaying computer generated graphs as a series of paths with the ability to filter and sort those paths based on intrinsic and extrinsic values. In particular, this invention allows the user to display and intuitively interact with computer generated graphs using a common spreadsheet style metaphor. A graph consists of a set of edges and nodes where edges connect nodes to nodes. Each edge and/or node can have any amount of other data associated with it, whether integer, real, boolean, textual or otherwise. The present embodiment of Graphtables allows the user to interactively: configure the sorting order of the columns of the table; define which data to display in each column; and compute new values or fields. By providing these few, but powerful set of operations, the user can quickly get a list of paths through a graph to answer targeted questions such as: which paths are of length 5 starting from a particular node; which nodes are directly connected to a particular node; and display all the paths that have a node with an address that is also 5 minutes away from another user-supplied address.

According to an embodiment of the present invention, Graphtables, comprises the steps of: accepting into a computer system an input graph from the user; computing all possible paths through the graph such that each path is unique and has no cycles; and display each path in a single row where upon initialization the first row starts with the shortest paths and the last row contains the longest path.

According to the preferred embodiment of the present invention, Graphtables, the spreadsheet metaphor is slightly changed in that the user is presented with a set of overall columns in the order of Node, Edge, Node, Edge, etc. There is one column for each element in the longest path, so if the longest path is of length 15, there are 15 main columns each labelled with Node or Edge. In the preferred embodiment, each main column is broken up into sub columns where each attribute of the node or edge is displayed in a sub column. The number of sub columns is equivalent to the number of unique attributes for all nodes or edges. This allows the present invention to accommodate nodes or edges with non-homogenous data and data types. In the preferred embodiment, when a node or edge does not contain a particular attribute, it simply doesn't display any value in that cell. Other embodiments may choose to display NULL or other value or symbol.

According to a feature of the present invention, Graphtables, the user can instruct the computer system to re-order the sub columns not labelled Node or Edge. In the preferred embodiment, this only alters the location within that one Node or Edge but in another embodiment, changing the column display order for sub columns could alter the display order for the other Node or Edge columns. There is no utility in moving the main columns labelled Node and Edge as they only let the user know that the column is displaying node or edge information.

According to a feature of the present invention, Graphtables, the user can instruct the computer system to sort any number of columns as is common in spreadsheet applications. The user selecting columns to sort is equivalent to a complex graph matching search where more relevant results are displayed first, but Graphtables achieves this effect without requiring any complex textual input. It is not necessary that each node or edge contain the same number of attribute data values. The preferred embodiment allows the user to decide when a node or edge does not contain a value, whether to consider that the node or edge lacking a value is displayed earlier or later in the table.

According to another embodiment of the present invention, Graphtables, the user can instruct the computer system to filter the data by all or any of the following: 1) all nodes and edges, 2) any subset of nodes or edges, and 3) any number of rows. When a path fails the filter, the preferred embodiment does not hide that path, it just makes its sorting order to be later in the list. This allows the user to still sort and view the filtered results in context with the other information. The preferred embodiment still sorts the filtered data in the same way as specified by the user and displays a line to depict that the rows below that line are filtered. This embodiment effectively converts filtering to a simple ranking calculation, showing possible relevant results where other graph implementations would have excluded those nodes or edges from the graph entirely. Those traditional implementations do not allow the user to see that there are paths that might have closely matched their filter.

According to another feature of the present invention, Graphtables, the user can instruct the computer system to insert main columns or sub columns that generate derived data for the entire graph, or any number of steps along the path. If the inserted columns are at the main level, the inserted columns are moveable next to any other already existing main column. If the inserted column is a sub column, that sub column location can be moved but is limited to the inserted main column.

According to another feature of the present invention, Graphtables, the user can instruct the computer system to choose to bundle edges so that if two neighboring rows share the same edge, the node is only displayed once and the edge is only displayed once on the first occurrence and all subsequent contiguous edges are displayed as edges from the primary edge.

DETAILED DESCRIPTION OF THE PREFERRED EMBODIMENT

This invention displays a user defined ordered set of paths with optional filters and user defined columns. In particular, this invention provides an interface to explore graph paths that satisfy extrinsic user needs.

Figure 1:
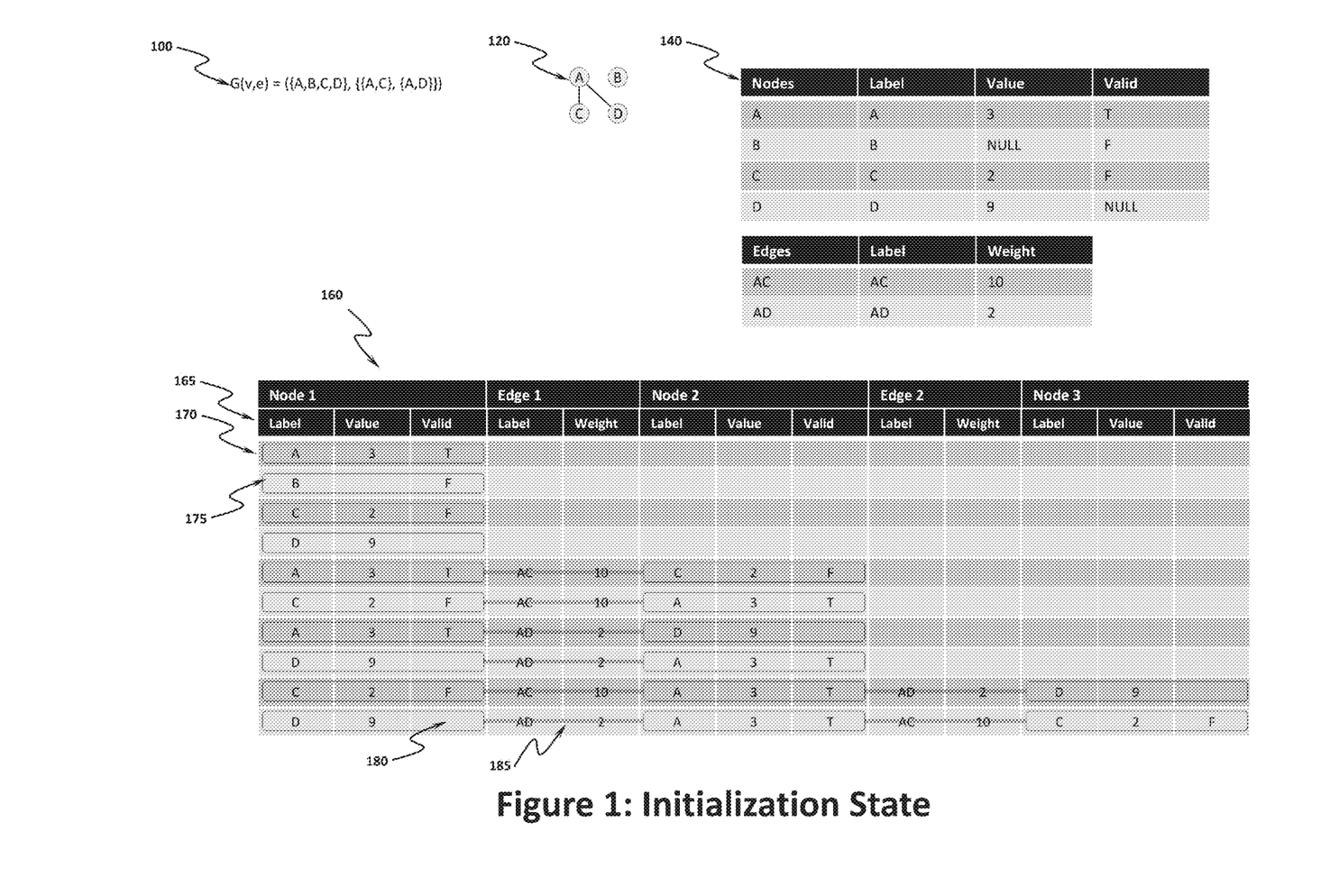
FIG. 1 depicts a sample graph with the default sorting, called the Initial State.

Referring to FIG. 1, the graph G is displayed in its initial state assuming the user had loaded a graph with the nodes and edges as defined in 100. 120 displays the same graph as the traditional node-link style of the same graph as defined in 100. 140 contains the additional metadata for each node and edge. 160 is the canonical depiction of the same graph as defined in 100, 120, and 140. 160 consists of 5 major columns, where each major column is named based upon the type of item that it contains, either nodes or edges and has a monotonically increasing column number for each node-edge pair and has subcolumns as in 165. The number of columns in 160 is defined based on the length of the longest path through the graph as defined by 100. The titles of the subcolumns as in 165 are based on the metadata in the underlying graph as defined by 140. Each row of the table as in 170 displays a single walk through the graph and its contents are based on the sorting order of the subcolumns in 165. The canonical representation for a node as in 175 is to simply surround the contents of the primary column as in 160 with a rounded rectangle. The visual depiction in 175 is solely to improve the user's interpretation and in no way affects the ability to: sort contents, alter the order of the columns, or insert user defined columns. The canonical representation for an edge as in 185 is to simply to draw a thick line behind the contents of the primary column as in 160. The visual depiction in 185 is solely to improve the user's interpretation and in no way affects the ability to: sort contents, alter the order of the columns, or insert user defined columns. 180 displays the canonical method of displaying NULL values metadata fields as empty cells.

Figure 2:
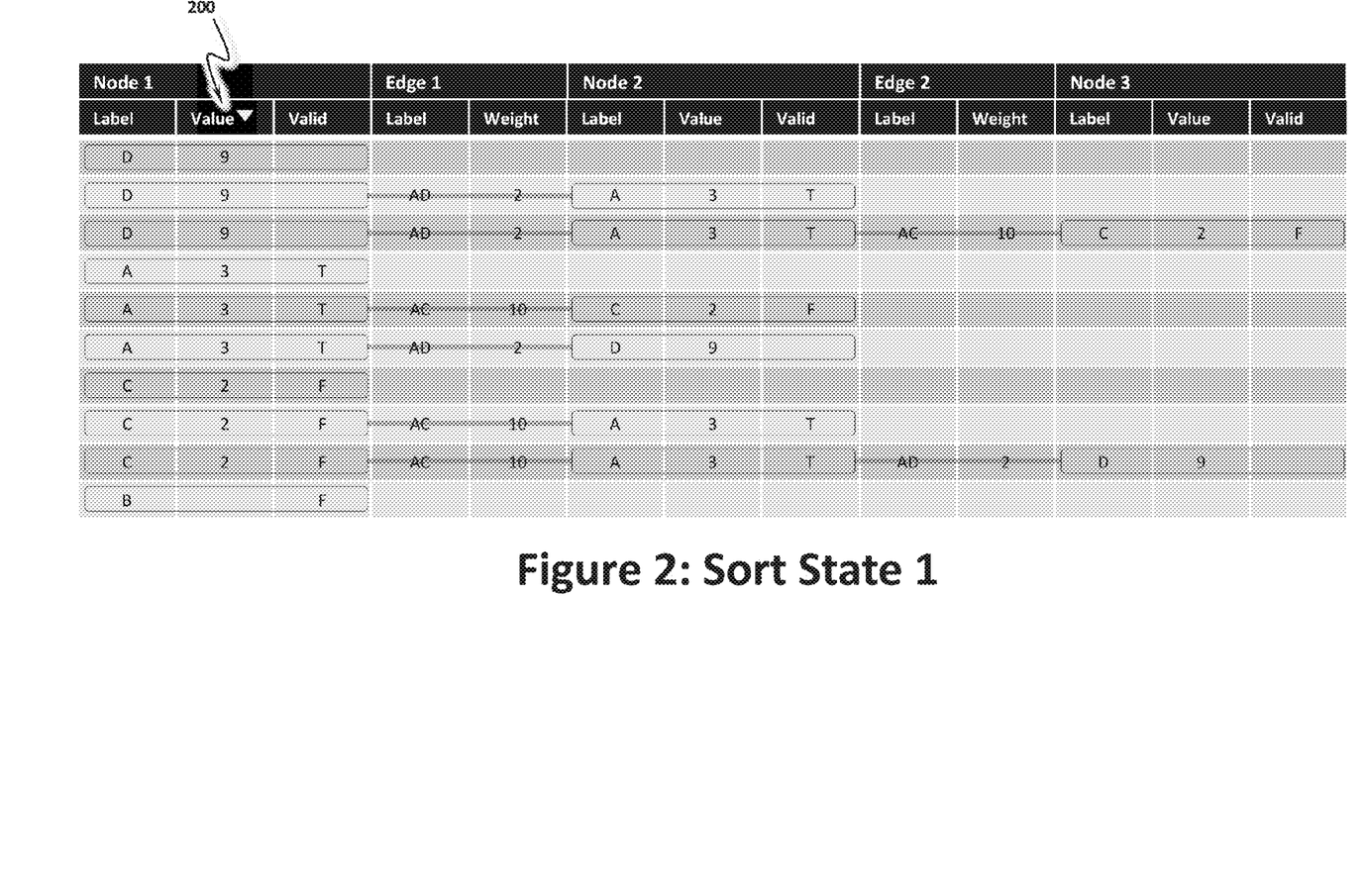
FIG. 2 shows the result of sorting by a single column from the Initial State.

Referring to FIG. 2 is the result of sorting the value column 200 in the graph as defined by 140 in descending order. This action causes the rows to be reordered based on the contents of that cell. Note that the entire path stays together and entire rows are sorted, not just the contents of a single column or subcolumn.

Figure 3:
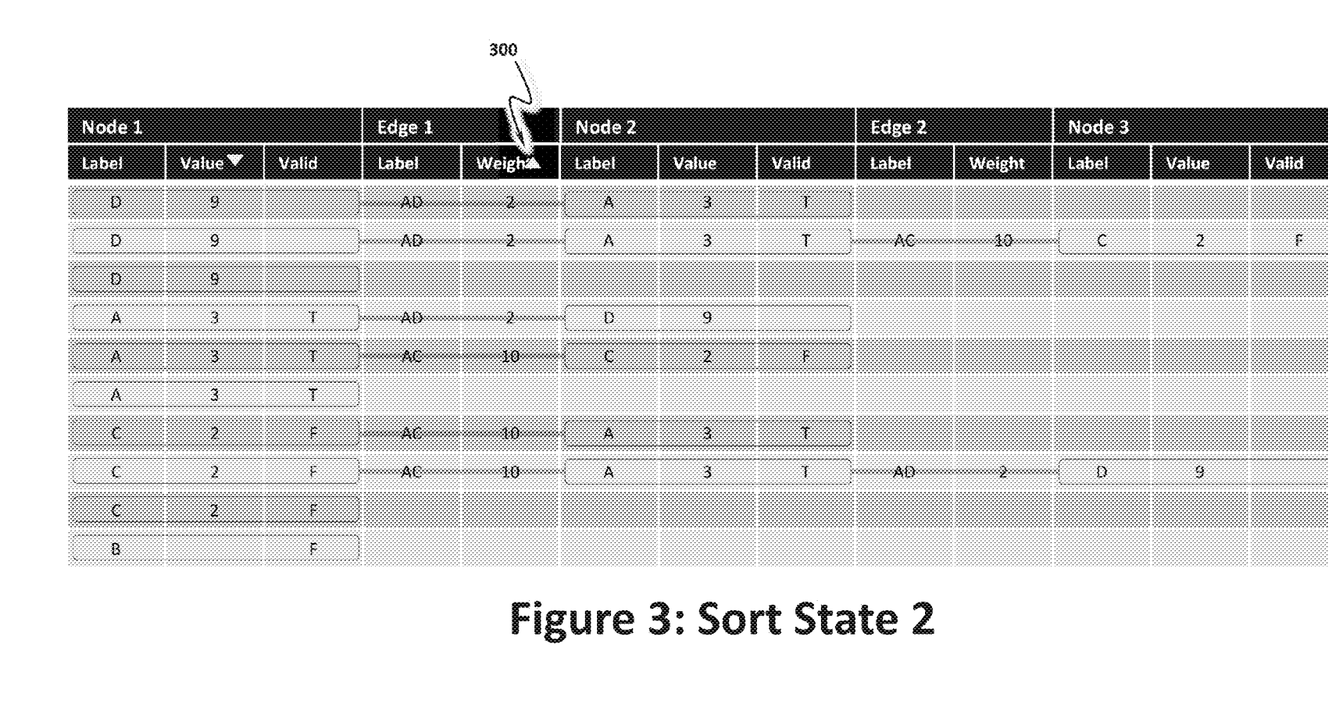
FIG. 3 shows the result of sub sorting by a second column from the state depicted in FIG. 2.

Referring to FIG. 3 is the result of sorting the weight column 300 in the graph as defined by 140 in ascending order after previously sorting was applied as in FIG. 2. Note that sorting precedence is applied, and the sort as applied in FIG. 2 stays consistent.

Figure 4:
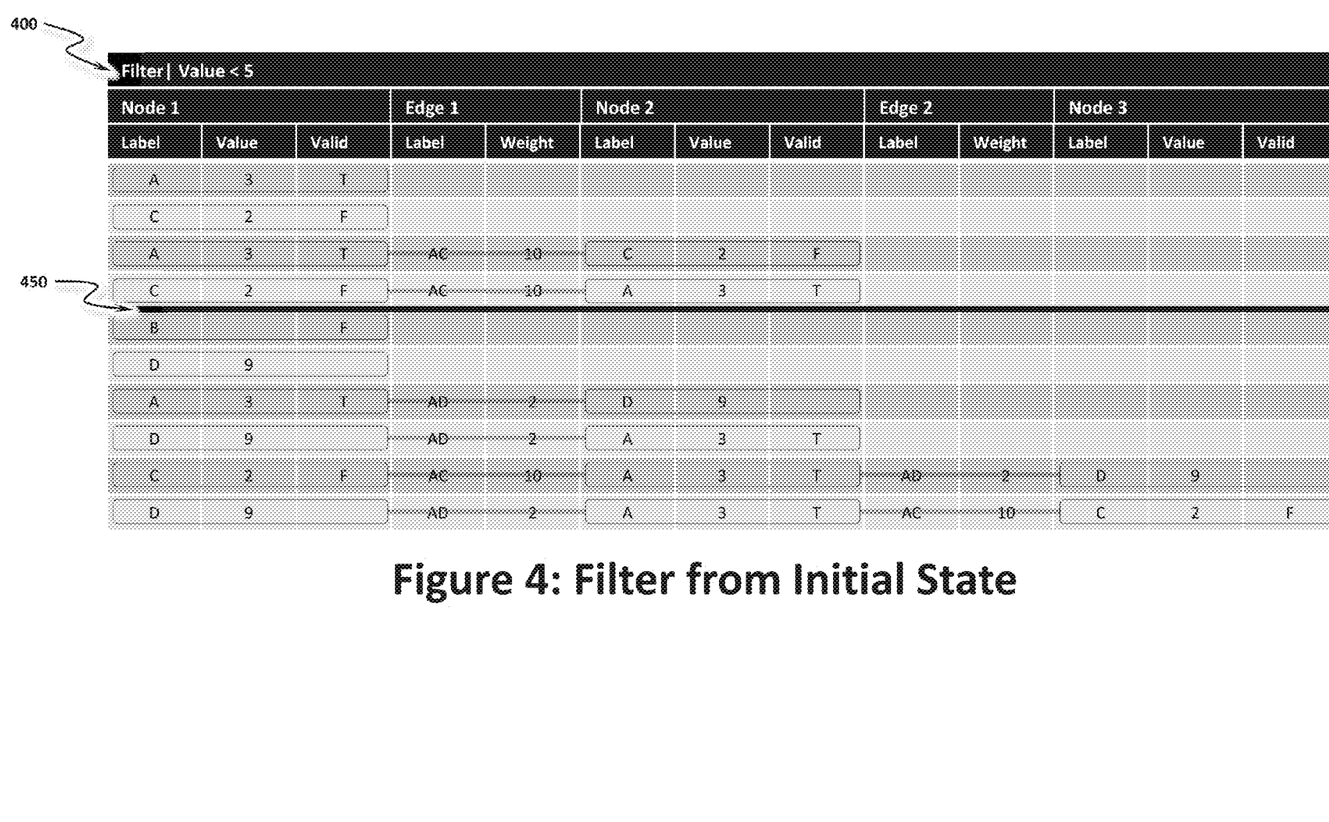
FIG. 4 shows the result of filtering the entire table from the Initial State.

Referring to FIG. 4 is the result of applying a graph filter 400 based off the initial state as displayed in FIG. 1. A graph based filter evaluates all elements in all paths for the entire graph. If any element fails the check, then the entire path fails the check and is considered filtered. In the canonical implementation, a filter doesn't eliminate the element, but instead serves as a sorting order modifier. In the canonical implementation, all non-filtered elements are displayed before all filtered elements, but regardless of filtered or non-filtered, all elements are still sorted. In the current embodiment, a dark line is drawn 450 to visually separate the filtered from non-filtered elements.

Figure 5:
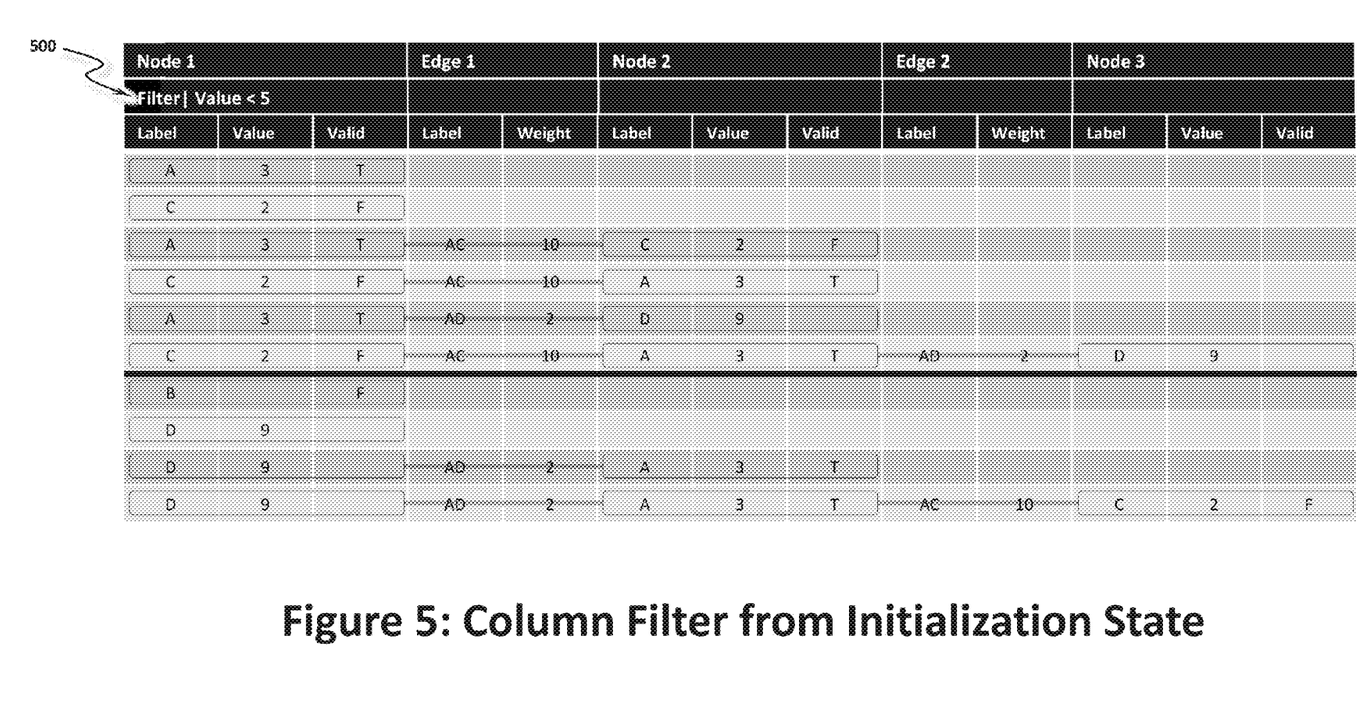
FIG. 5 shows the result of filtering a single column from the Initial State.

Referring to FIG. 5 is the result of applying a column based filter 500 off the initial state as displayed in FIG. 1. A column based filter only compares a filter equation (i.e., criteria) versus elements in the column in which it is defined. If any element in the subordinate column 500 fails the filter criteria then the entire row (aka path) fails the check and is considered filtered. In the canonical implementation, a filter doesn't eliminate the element, but instead serves as a sorting order modifier. In the canonical implementation, all non-filtered elements are displayed before all filtered elements, but regardless of filtered or non-filtered, all elements are still sorted.

Figure 6:
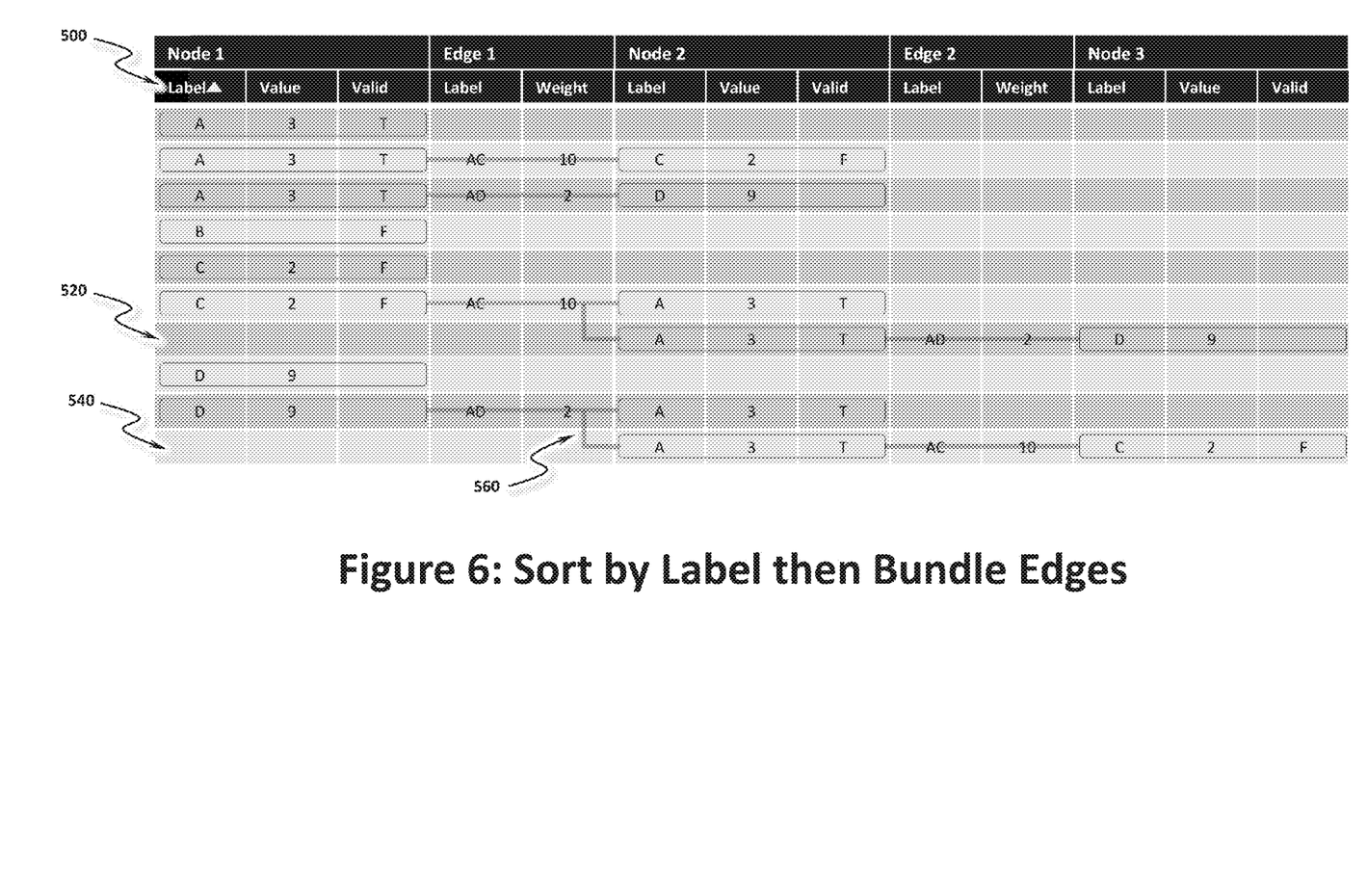
FIG. 6 shows the result of edge bundling.

Referring to FIG. 6 is the result of sorting the label column 500 in the graph as defined by 140 in descending order. This action causes the rows to be reordered based on the contents of that cell. Note that the entire path stays together and entire rows are sorted, not just the contents of a single column or subcolumn. Additional to the sorting, FIG. 6 depicts the process of edge bundling. Subsequent consecutive rows that would duplicate the same value 520, 540 are displayed as a forked edge 560 instead of duplicating the values. This reduces the visual clutter and is intended to preserve the visual the uniqueness of each path.

Figure 7:
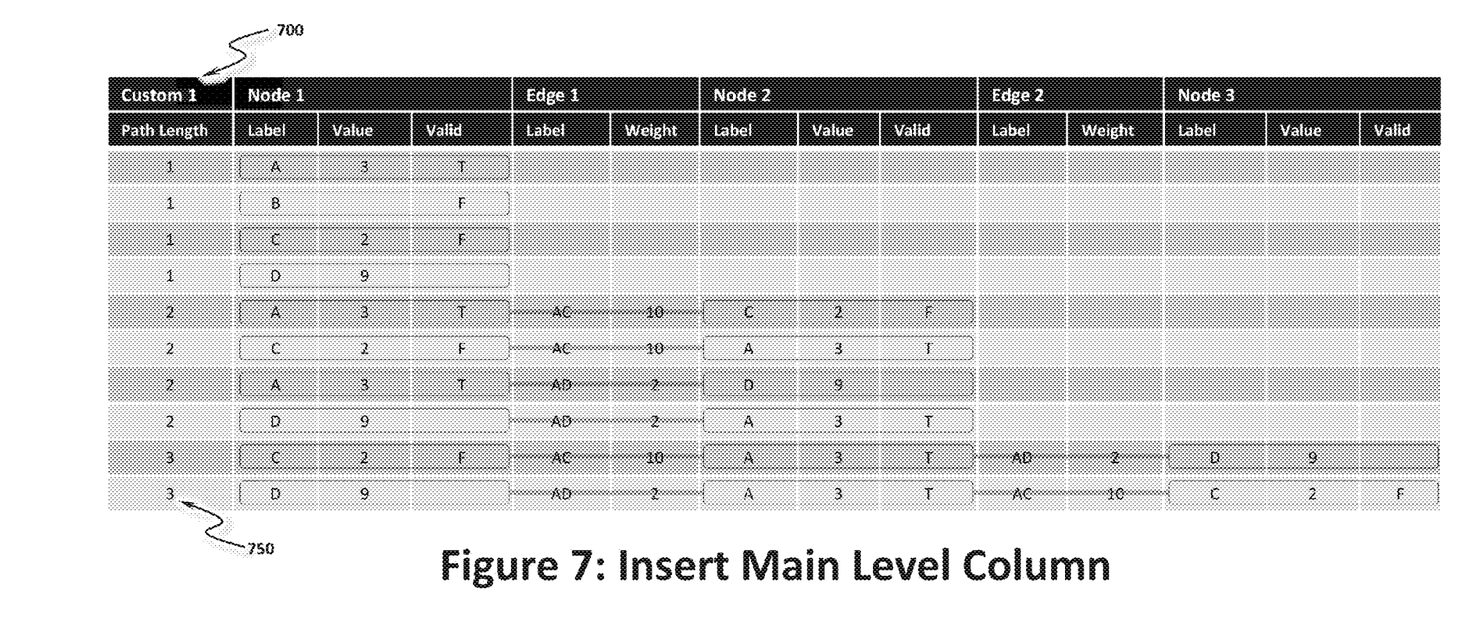
FIG. 7 shows the result of inserting a custom main level computed column.

Referring to FIG. 7 is the result of inserting a custom top level column 700 used to compute some value based on the contents of the path or the graph. In this case, the value as seen in 750 displays the computed path length. These computed column(s) can also be used as sorting column and work the same as in previous examples. Unlike the path based main level columns 160, custom columns can be relocated to anywhere the user desires.

Other embodiments do not display filtered elements, and the number of failed filters can also be used to further reduce the rank of a filtered path. This means that a path that only fails one filter would rank higher than a path that failed two filters.

Other embodiments may choose to hide columns or rows to reduce the amount of displayed content. Other embodiments may also dramatically change the visual metaphor of using rounded rectangles for nodes and lines for edges.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. An apparatus for the retrieval, sorting, filtering and graphical visualization of information comprising a computer system and a software program stored in a non-transitory medium, said software program comprising computer implementable instructions which when executed by said computer system cause said computer system to:
   define the nodes and edges of a graph to be graphically visualized, wherein said nodes and edges correspond to user-defined metadata;
   graphically visualize said defined graph in an initial state, wherein said graph visualization further comprises:
   a metadata definition;
   a plurality of major columns each corresponding to a node;
   a plurality of major columns each corresponding to an edge;
   a plurality of sub columns wherein each sub column corresponds to a category of said metadata and wherein each plurality corresponds to each said major column; and
   a plurality of rows, wherein
      each of said plurality of rows further comprises a plurality of cells containing metadata corresponding to a corresponding sub column's category of metadata; and
      wherein
      each of said plurality of rows corresponds to a separate traversal through said graph; and
   to apply a sorting criteria to a subcolumn so as to reorder the position of said plurality of rows within said graph.

2. The apparatus of claim 1, further causing said computer system to:
   encircle together all data cells corresponding to a particular node; and
   strike a continuous line through all cells corresponding to a particular edge.

3. The apparatus of claim 2, wherein the number of said major columns is defined by the most lengthy traversal through said graph.

4. The apparatus of claim 3, wherein said sorting criteria further causes said computer system to:
   retain said reordering of said rows from a prior sort; and
   apply a subsequent sorting criteria to said retained reordering of said rows.

5. The apparatus of claim 4, further causing said computer system to apply graph filtering according to a graph filter criteria, wherein said graph filtering:
   evaluates all cells in all paths;
   identifies those paths in which a cell fails said filter criteria;
   sorts those rows containing failed paths beneath rows containing non-failed paths; and
   denotes the demarcation between rows containing failed and non-failed paths by displaying a visual cue therebetween.

6. The apparatus of claim 5, further comprising instructing said computer system to apply column filtering according to a column filter criteria, wherein said column filtering:
   evaluates all cells in a column to which column filtering is being applied;
   identifies those paths having a cell which fails said column filter criteria;
   sorts those rows containing failed paths beneath rows containing non-failed paths; and
   denotes the demarcation between rows containing failed and non-failed paths by displaying a visual cue therebetween.

7. The apparatus of claim 6, wherein when said sorting or filtering result in consecutive rows having identical cell values in the same major column, said computer system:
   denotes edge bundling between said consecutive row identical cell values by displaying a visual cue interconnecting said edges thereof.

8. The apparatus of claim 7, wherein said computer system:
   inserts additional major columns and sub columns thereunder into said graph visualization; and
   applies a sorting criteria to said inserted sub columns so as to reorder the position of said plurality of rows within said graph vizualization.

9. The apparatus of claim 5 wherein said visual cue comprises a line.

* * * * *